United States Patent
Bhatia et al.

(10) Patent No.: US 9,317,553 B2
(45) Date of Patent: Apr. 19, 2016

(54) DECLARATIVE PARTITIONING FOR DATA COLLECTION QUERIES

(71) Applicant: Microsoft Technology Licensing, LLC, Redmond, WA (US)

(72) Inventors: Puneet Bhatia, Bellevue, WA (US); Spencer Alan Bishop, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 37 days.

(21) Appl. No.: 13/664,424

(22) Filed: Oct. 31, 2012

(65) Prior Publication Data

US 2014/0122530 A1     May 1, 2014

(51) Int. Cl.
*G06F 17/30*     (2006.01)

(52) U.S. Cl.
CPC .... *G06F 17/30445* (2013.01); *G06F 17/30979* (2013.01)

(58) Field of Classification Search
CPC ................................................ G06F 17/30477
USPC ........................................................ 707/779
See application file for complete search history.

(56) References Cited

U.S. PATENT DOCUMENTS

| | | | |
|---|---|---|---|
| 2004/0205082 A1 | 10/2004 | Fontoura et al. | |
| 2006/0036617 A1* | 2/2006 | Bastawala et al. | 707/100 |
| 2010/0088672 A1* | 4/2010 | Langworthy et al. | 717/109 |
| 2011/0191323 A1 | 8/2011 | Agarwal et al. | |
| 2012/0047284 A1 | 2/2012 | Tarkoma | |
| 2012/0078939 A1 | 3/2012 | Chen et al. | |

OTHER PUBLICATIONS

Fritchey et al., SQL Server 2008 Query Performance Tuning Distilled, 2009.*
Hall, Chunking Bulk Collections Using the LIMIT Clause, 2006.*
Stack Overflow, Break up a SQL Server 2008 query into batches, 2011.*
Sullivan, Handling time in stored procedures, Nov. 16, 2011.*
Jayachandran, et al., "Object Based Data Partition Algorithm for XML Database", Retrieved at <<http://www.iosrjen.org/Papers/vol2_issue7%20%28part-1%29/M0277881.pdf>>, Proceedings of IOSR Journal of Engineering, Jul. 2012, pp. 4.
Lehner, et al., "XPath-Aware Chunking of XML-Documents", Retrieved at <<http://citeseerx.ist.psu.edu/viewdoc/download-?doi=10.1.1.69.3613&rep=rep1&type=pdf>>, In Gerhard Weikum; Harald Schöning & Erhard Rahm, ed, Retrieved Date: Sep. 12, 2012, pp. 19.

* cited by examiner

*Primary Examiner* — William Spieler
(74) *Attorney, Agent, or Firm* — Aneesh Mehta; Kate Drakos; Micky Minhas

(57) ABSTRACT

Aspects of the subject matter described herein relate to data collection. In aspects, when data is desired from one or more data sources, a size and/or other data regarding the data is obtained. Then, a data structure is generated that indicates multiple chunks of the data to obtain. Using the data structure and a query template, a query is generated to obtain a chunk of data. The obtained chunk of data is stored in a local store. If more chunks need to be obtained, first a wait for a period is performed before submitting another query for another chunk of data.

20 Claims, 4 Drawing Sheets

DECLARATIVE PARTITIONING FOR DATA COLLECTION QUERIES

BACKGROUND

A production database may include gigabytes or more of data. A query of such a database may return a large quantity of data. Issuing the query to the database and requesting the data represented by the query may cause performance of the database to degrade in a way that is noticeable to users of the database. In some circumstances, the performance of the database may slow to a crawl while the database is used to satisfy the query. This may be unacceptable to other users of the database.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to data collection. In aspects, when data is desired from one or more data sources, a size and/or other data regarding the data is obtained. Then, a data structure is generated that indicates multiple chunks of the data to obtain. Using the data structure and a query template, a query is generated to obtain a chunk of data. The obtained chunk of data is stored in a local store. If more chunks need to be obtained, first a wait for a period is performed before submitting another query for another chunk of data.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrases "first version" and "second version" do not necessarily mean that the first version is the very first version or was created before the second version or even that the first version is requested or operated on before the second version. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
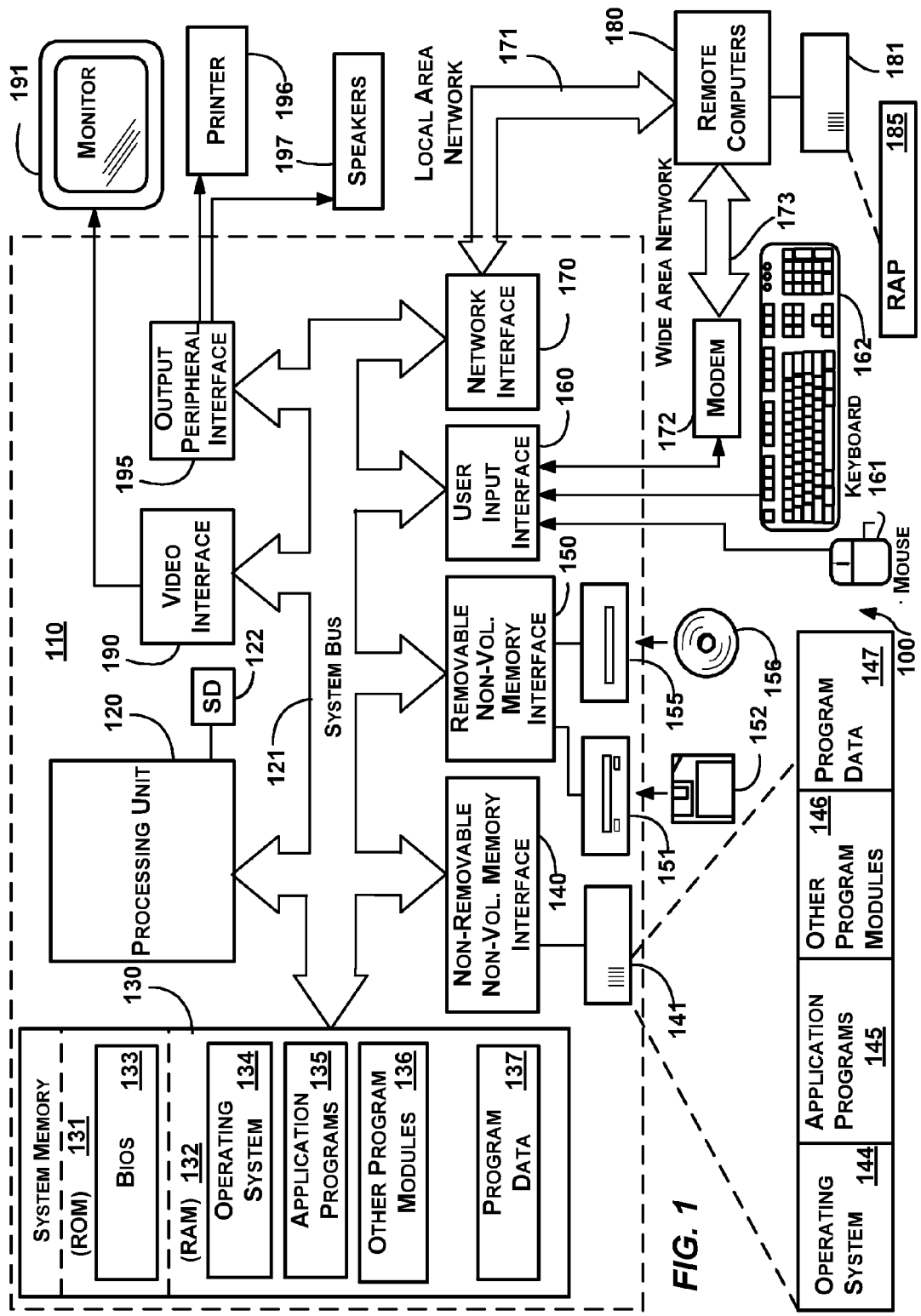
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers—whether on bare metal or as virtual machines—, hand-held or laptop devices, multiprocessor systems, microcontroller-based systems, set-top boxes, programmable and non-programmable consumer electronics, network PCs, minicomputers, mainframe computers, personal digital assistants (PDAs), gaming devices, printers, appliances including set-top, media center, or other appliances, automobile-embedded or attached computing devices, other mobile devices, phone devices including cell phones, wireless phones, and wired phones, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Alternatively, or in addition, the functionally described herein may be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and the like.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The processing unit 120 may be connected to a hardware security device 122. The security device 122 may store and be able to generate cryptographic keys that may be used to secure various aspects of the computer 110. In one embodiment, the security device 122 may comprise a Trusted Platform Module (TPM) chip, TPM Security Device, or the like.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media. By way of example, and not limitation, computer-readable media may comprise computer storage media and communication media.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

Computer storage media includes both volatile and non-volatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs) or other optical disk storage, magnetic cassettes, magnetic tape, magnetic disk storage or other magnetic storage devices, or any other storage medium which can be used to store the desired information and which can be accessed by the computer 110. Computer storage media does not include communication media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM, DVD, or other optical media. Other removable/non-removable, volatile/nonvolatile computer storage media that can be used in the exemplary operating environment include magnetic tape cassettes, flash memory cards and other solid state storage devices, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable nonvolatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone (e.g., for inputting voice or other audio), joystick, game pad, satellite dish, scanner, a touch-sensitive screen, a writing tablet, a camera (e.g., for inputting gestures or other visual input), or the like. These and other input devices are often connected to the processing unit 120 through a user input interface 160 that is coupled to the system bus, but may be connected by other interface and bus structures, such as a parallel port, game port or a universal serial bus (USB).

Through the use of one or more of the above-identified input devices a Natural User Interface (NUI) may be established. A NUI, may rely on speech recognition, touch and stylus recognition, gesture recognition both on screen and adjacent to the screen, air gestures, head and eye tracking, voice and speech, vision, touch, gestures, machine intelligence, and the like. Some exemplary NUI technology that may be employed to interact with a user include touch sensitive displays, voice and speech recognition, intention and goal understanding, motion gesture detection using depth cameras (such as stereoscopic camera systems, infrared camera systems, RGB camera systems, and combinations thereof), motion gesture detection using accelerometers/gyroscopes, facial recognition, 3D displays, head, eye, and gaze tracking, immersive augmented reality and virtual reality systems, as well as technologies for sensing brain activity using electric field sensing electrodes (EEG and related methods).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include phone networks, near field networks, and other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Partitioning for Data Collection

Figure 2:
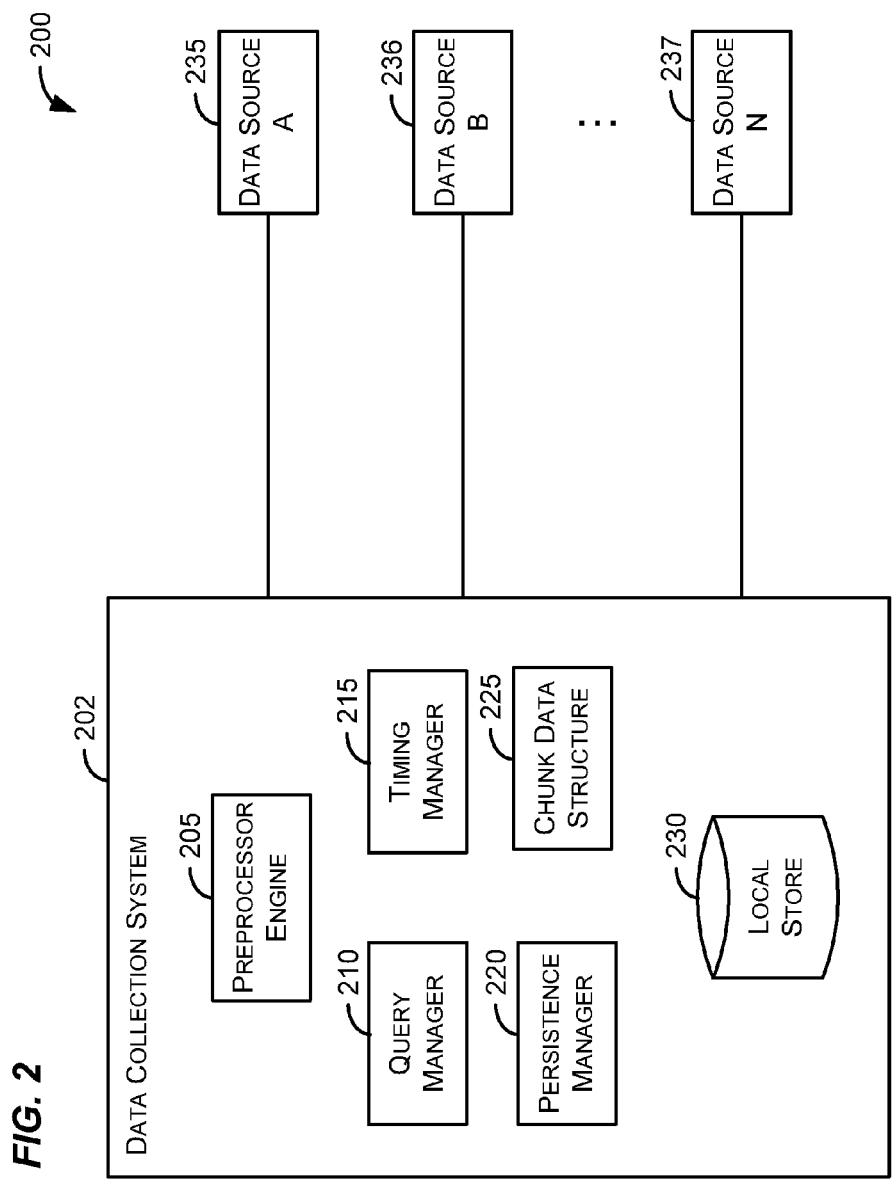
FIG. 2 is a block diagram that represents an exemplary environment in which aspects of the subject matter described herein may operate.

As mentioned previously, a query may cause the performance of a database to degrade. FIG. 2 is a block diagram that represents an exemplary environment in which aspects of the subject matter described herein may operate. The entities illustrated in FIG. 2 are exemplary and are not meant to be all-inclusive of entities that may be needed or included. In other embodiments, the entities and/or functions described in conjunction with FIG. 2 may be included in other entities (shown or not shown) or placed in sub entities without departing from the spirit or scope of aspects of the subject matter described herein. In some embodiments, the entities described in conjunction with FIG. 2 may be distributed across multiple devices.

One or more of the entities illustrated in FIG. 2 may be implemented by one or more computing devices. Computing devices may include one or more personal computers, server computers, hand-held or laptop devices, multiprocessor systems, microcontroller-based systems, set-top boxes, programmable and non-programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to act as one or more of the entities of the system 200 comprises the computer 110 of FIG. 1.

Where a line connects one entity to another or where two entities are found in the same figure, it is to be understood that the two entities may be connected (e.g., logically, physically, virtually, or otherwise) via any type of network including a direct connection, a local network, a non-local network, the Internet, some combination of the above, and the like. For example, a line may represent one or more local area networks, wide area networks, direct connections, virtual connections, private networks, virtual private networks, some combination of the above, and the like.

One or more of the entities illustrated in FIG. 2 may be implemented in a virtual environment. A virtual environment is an environment that is simulated or emulated by a computer. The virtual environment may simulate or emulate a physical machine, operating system, set of one or more interfaces, portions of the above, combinations of the above, or the like. When a machine is simulated or emulated, the machine is sometimes called a virtual machine. A virtual machine is a machine that, to software executing on the virtual machine, appears to be a physical machine. The software may save files in a virtual storage device such as virtual hard drive, virtual floppy disk, and the like, may read files from a virtual optical device, may communicate via a virtual network adapter, and so forth.

More than one virtual machine may be hosted on a single computer. That is, two or more virtual machines may execute on a single physical computer. To software executing in each virtual environment, the virtual environment appears to have its own resources (e.g., hardware) even though the virtual machines hosted on a single computer may physically share one or more physical devices with each other and with the hosting operating system.

One or more of the entities in the system 200 may be hosted in the cloud. The cloud is a term that is often used as a metaphor for the Internet. It draws on the idea that computation, software, data access, storage, and other resources may be provided by entities connected to the Internet without requiring users to know the location or other details about the computing infrastructure that delivers those resources.

An entity hosted in the cloud may be implemented as service. A service may be implemented using one or more processes, threads, components, libraries, and the like that perform a designated task. A service may be implemented in hardware, software, or a combination of hardware and software. A service may be distributed over multiple devices or may be implemented on a single device.

Turning to FIG. 2, the system 200 may include a data collection system 202 and data sources 235-237. The data collection system may include a preprocessing engine 205, a query manager 210, a timing manager 215, a persistence manager 220, a chunk data structure 225, a local store 230, and other entities (not shown).

The data sources 235-237 may include any entities that are capable of providing data. In one example, the data sources 235-237 may include services, Web servers, file servers, reporting mechanisms, monitoring systems, or the like.

In another example, the data sources 235-237 may be part of a database system. In this example, the data sources 235-237 may be a part of relational databases, object-oriented databases, hierarchical databases, network databases, other types of databases, some combination or extension of the above, and the like. Data stored in a database may be organized in tables, records, objects, other data structures, and the like. The data stored in a database may be stored in dedicated database files, dedicated hard drive partitions, HTML files, XML files, spreadsheets, flat files, document files, configuration files, other files, and the like. A database may reference a set of data that is read-only to the database or may have the ability to read and write to the set of data.

Data in a database may be accessed via a database management system (DBMS). A DBMS may comprise one or more programs that control organization, storage, management, and retrieval of data of a database. A DBMS may receive requests to access data in a database and may perform the operations needed to provide this access. Access as used herein may include reading data, writing data, deleting data, updating data, a combination including two or more of the above, and the like.

In describing aspects of the subject matter described herein, for simplicity, terminology associated with relational databases is sometimes used herein. Although relational database terminology is sometimes used herein, the teachings herein may also be applied to other types of databases and data sources including those that have been mentioned previously.

The preprocessor engine 205 may be hosted on one or more computers as previously indicated. The preprocessor engine 205 may be configured to generate a data structure (e.g., the chunk data structure 225) that indicates chunks of data to obtain from one or more of the data sources 235-237.

The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

A chunk of data is a portion of the data available from the data sources 235-237. A chunk of data may correspond to the data that would be returned from the data sources 235-327 in response to a query that has criteria (e.g., a where clause) for limiting the query. A chunk of data may correspond to data having a certain size as measured in bytes, rows, or the like.

The chunk data structure 225 identifies chunks of data in the data that is to be collected. In one example, the chunk data structure 225 may be implemented as a table that has rows. Each row of the table may include a start value and an end value. Each start value and corresponding end value of a row together may indicate a chunk of the data different from a chunk of data indicated by a start value and end value of another row. Chunks of data may be overlapping or non-overlapping and may be contiguous or non-contiguous without departing from the spirit or scope of aspects of the subject matter described herein.

The start value and end value may be inserted into a query template that returns a subset of the total data desired. In another example, the chunk data structure may be implemented as an array, linked list, hierarchical data structure, XML or other markup document, other data structure, or the like.

The query template may be specified in a document. For example, a declarative document may include declarative statements and a query template. An example of a declarative document is as follows:

```
<SqlClass ClassName="sample"
    ID="E2625472-9188-4937-9D8C-C92FB072574B"
    PostCollectionDelayInSeconds="30"
    DatabaseType="SQL">
    <PreprocessingQuery SubstitutionTargets="Query">
        <Variable Name="startdate"/>
        <Variable Name="enddate"/>
        <Sql>
            EXEC [dbo].[sp_preprocessor_getdates]
        </Sql>
    </PreprocessingQuery>
    <Query>
        SELECT * FROM SomeTable T Where [T].[TimeStamp]
        BETWEEN '$startdate' AND '$enddate'
    </Query>
    <StoredProcedure Name="sp_insertData"/>
    <Attribute Source="UserName"/>
    <Attribute Source="ServerDeviceName"/>
    <Attribute Source="ClientDeviceName"/>
    <Attribute Source="TimeStamp"/>
</SqlClass>
```

The query specified in the document indicates a table and selection criteria. The selection criteria include two variables: $startdate and $enddate. When the start value and the end value of the chunk data structure are inserted into the query as the values of these variables, the resulting query returns a subset of the data that would be returned without the criteria.

The document above also includes some other features:
1. ID. This may be used to identify this data collector.
2. PostCollectionDelayInSeconds. This may identify a period to wait between submitting queries to the data sources. To avoid degrading the performance of the data sources 235-237, the data collection system may collect desired data by partitioning data retrieval into many chunks of data, issuing a query for one of the chunks, waiting for the query to complete, and then waiting for a period to expire before issuing a query for another one of the chunks. By making the size of the chunks sufficiently small and waiting an appropriate time between queries, the data collection system 202 may collect data from the data sources 235-237 without significantly degrading the performance of the data sources 235-237.

The size of the chunks may be determined by the total size of data desired as well as by the performance characteristics of the data sources 235-237. The time between queries may be determined by the characteristics of the data sources and other factors such as quality of service, minimum latency, bandwidth, and the like.

In one example, the delay may be specified as a static number as illustrated in the example above (e.g., 30 seconds). In another example, the delay may be specified by a formula. The formula may include any desired variable including, for example, size of a chunk of data, hardware characteristics of one or more devices in the system, the factors mentioned above, and the like. The formula may be configurable or hard coded.

3. DatabaseType. This may indicate the type of data source from which the data is to be obtained. In this example, the data source is a database that can be accessed via structured query language (SQL) commands. The database type may indicate a database and version produced by a specific vendor. This may be helpful in generating queries and determining time between queries.

4. PreprocessingQuery. This specifies variables that will be filled with data from the chunk data structure and substituted in the query.

5. Sql. In the example above, this specifies a stored procedure that, when executed, generates the chunk data structure 225. In another example, this may specify other actions that, when executed, generate the chunk data.

6. StoredProcedure Name. In the example above, this specifies the name of a stored procedure that takes the data returned in response to a query and places it in the local store. In another example, this may specify other actions that, when executed store the returned data in the local store 230.

7. Attribute. The attribute fields indicate identifiers (column names, attributes, or the like) into which the data returned in response to a query is placed.

In the example above, the returned data may be limited by date values. In other examples, the returned data may be limited by other value types (e.g., row value, byte values, identifier values, key values, or the like). Furthermore, although only two values are indicated in the example above, in other examples, one or more than two values may be used to limit the data returned by a query. For example, multiple values may be used to limit returned data to data corresponding to a portion of an n-dimensional space.

The preprocessor engine 205 (or another entity of the data collection system 202) may engage in discovery of the data sources 235-237. For example, the preprocessor engine 205 may query components of a distributed database system to determine locations of data sources within the distributed database system. Through querying the components, the preprocessor engine 205 may also determine a size (e.g., number of rows, bytes, or the like) or other information about the data that is encompassed by the query. The preprocessor engine 205 may then build the chunk data structure 225 to divide the query into smaller chunks based on start and stop values corresponding to the discovered data.

In one example, the number of entries in the chunk data structure is fixed. In another example, the number of entries depends on the amount of data that is discovered. In yet another embodiment, the number of entries may be configurable and may be determined by a hard coded or configuration-provided formula as indicated previously.

The query manager 210 may be configured to generate a query from a template and to include values from the chunk data structure 225 in the query. For example, the query manager 210 may obtain declarative statements from the declarative document mentioned previously. The declarative statements may indicate the data that is desired without indicating the steps for obtaining the data.

To maintain consistency in the obtained data, the query manager 210 may re-obtain chunks of data that have changed since previously obtaining them. For example, after obtaining a chunk of data, the query manager 210 may determine (or be informed) that one or more previously obtained chunks of data have changed after they have already been obtained from one or more of the data sources. In this case, the query manager 210 may issue queries to obtain these chunks of data that have changed. The query manager 210 may do this before obtaining the next chunk, after all chunks have been obtained, or at other times without departing from the spirit or scope of aspects of the subject matter described herein.

The timing manager 215 may be configured to determine a period to wait between queries, to wait until the period has expired, and then to inform the query manager 210 that the period has expired so that the query manager 210 may issue another query, if needed. The timing manager may determine the period to wait by reading configuration data that includes data indicative of the period. In one example, the configuration data may include a formula for computing the period to wait.

The persistence manager 220 may be operable to save chunks of data to the local store 230. In one example, the local store 230 is hosted on a device on which the persistence manager is hosted 220. In another example, the local store 230 is hosted on a device on a network that is local to the persistence manager 220.

The local store 230 is any storage media capable of storing data. The store may have storage elements (e.g., hard disks, memory, or the like) to store chunks of data. The local store 230 may comprise non-volatile memory (e.g., a hard drive), volatile memory (e.g., RAM), other storage media described in conjunction with FIG. 1, some combination of the above, and the like and may be distributed across multiple devices. The local store may be external, internal, or include components that are both internal and external to a device hosting the persistence manager 220.

Figure 3:
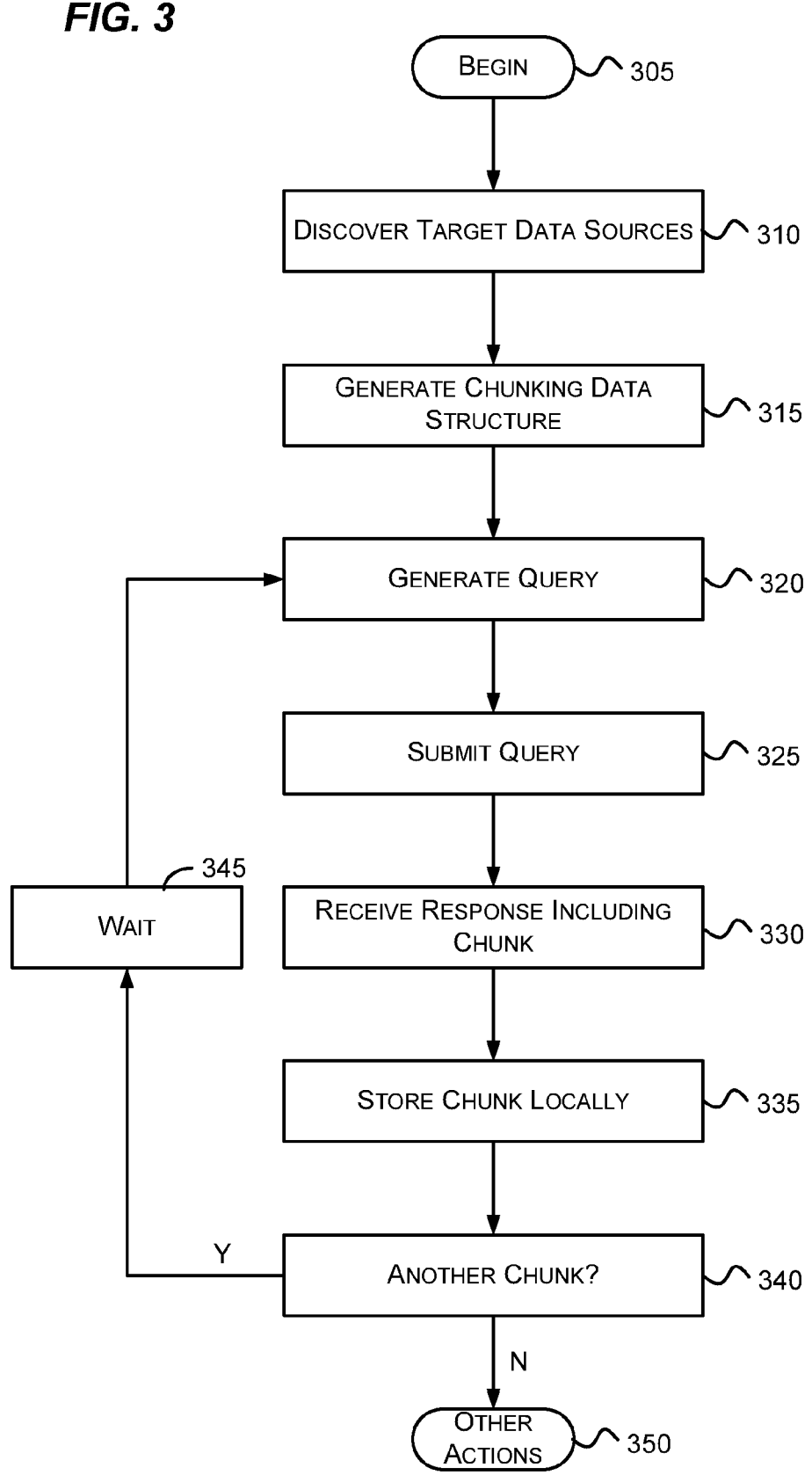
FIGS. 3-4 are flow diagrams that generally represent exemplary actions that may occur in accordance with aspects of the subject matter described herein.
Figure 4:
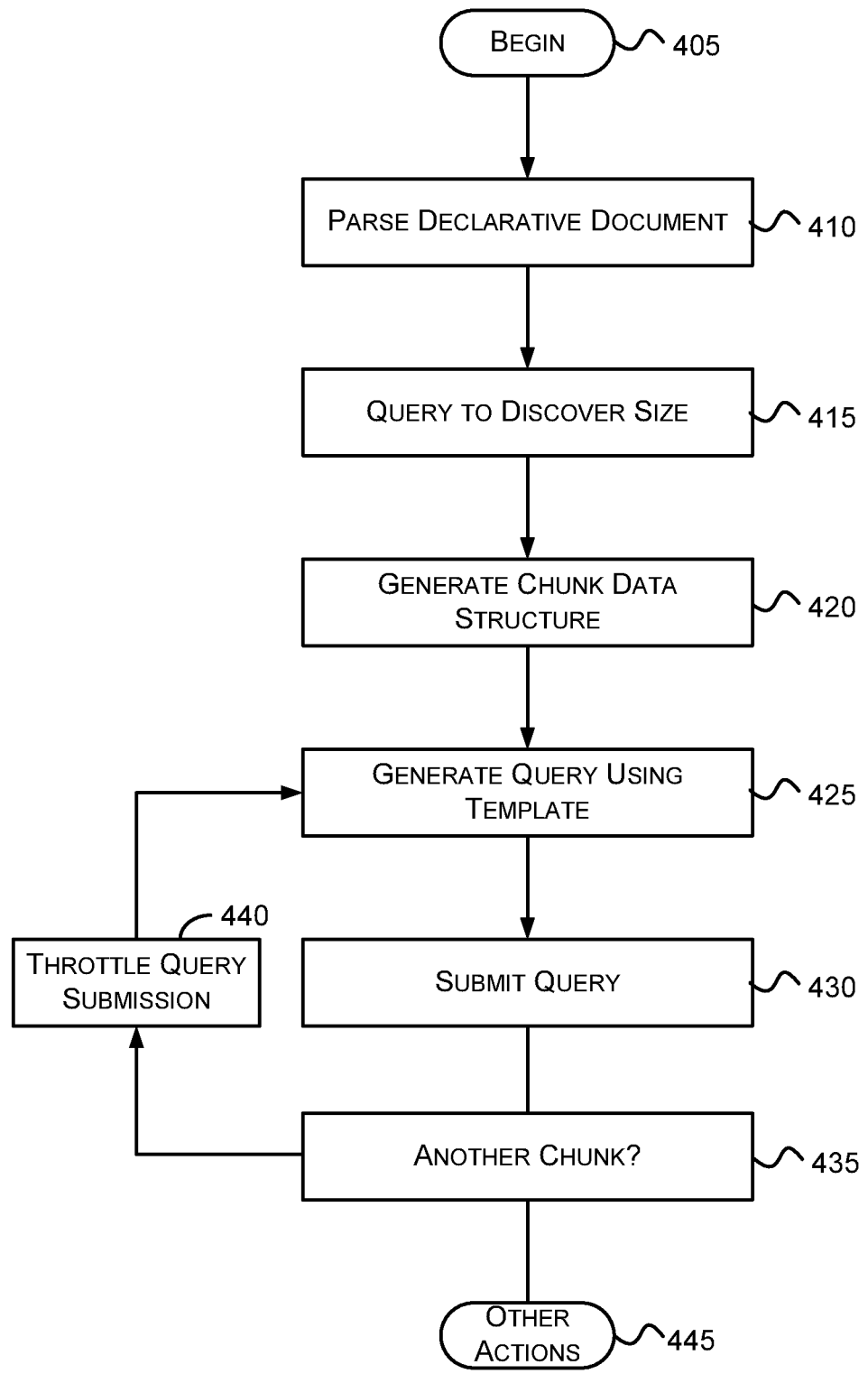

FIGS. 3-4 are flow diagrams that generally represent exemplary actions that may occur in accordance with aspects of the subject matter described herein. For simplicity of explanation, the methodology described in conjunction with FIGS. 3-4 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 3, at block 305, the actions begin. At block 310, one or more target data sources are discovered from which to obtain data. For example, referring to FIG. 2, the preprocessing engine 205 may query components of a distributed database system to determine locations of data sources within the distributed database system.

At block 315, a data structure is generated that indicates chunks of data to obtain from the one or more data sources. For example, referring to FIG. 2, the preprocessor engine 205 may generate the chunk data structure 225 to indicate chunks of data to obtain from the data sources 235-237.

At block 320, a query is generated from a template. The query includes values derived from the data structure. For example, referring to FIG. 2, the query manager 210 may find a template (e.g., such as the template described earlier) in a declarative document, obtain a query from the template, and insert values from the chunk data structure 225 into the query.

At block 325, the query is submitted to one or more of the target data sources. For example, referring to FIG. 2, the query manager 210 may submit the query generated at block 320 to one or more of the data sources 235-237.

At block 330, a response to the query is received. The response includes the chunk of data specified by the query.

For example, referring to FIG. 2, the query manager 210 may receive a chunk of data from the data source 235.

At block 335, the chunk of data is stored in a local data store. For example, referring to FIG. 2, the persistence manager 220 stores the chunk of data in the local store 230.

At block 340, a determination is made as to whether another chunk of data is to be obtained. If so, the actions continue at block 345; otherwise, the actions continue at block 350. If all of the chunks of data indicated in the chunk data structure have been obtained, then no more chunks need to be obtained; otherwise, one or more chunks still need to be obtained.

At block 345, a wait is performed before allowing the next query to be submitted. For example, referring to FIG. 2, the timing manager 215 may determine a period to wait, wait until the period expires, and after the period has expired, inform the query manager 210 that another query may be submitted. Determining a period to wait may, for example, include obtaining a value from configuration data (e.g., such as a declarative document or other configuration data), obtaining a formula and using the formula to computer a period to wait, or the like. A formula, if used, may, for example, be based on a characteristic of one or more of the target data sources, a size of a chunk of data or the total data to be obtained, other factors as mentioned previously, or the like.

At block 350, other actions, if any, may be performed. For example, the actions of blocks 325-345 may be repeated until all the chunks of data have been obtained from the one or more target data sources.

Turning to FIG. 4, at block 405, the actions begin. At block 410, a document that includes declarative statements is parsed. The declarative statements indicate data to obtain from target data sources but do not constrain steps for obtaining the data. In other words, the declarative statements indicate data to obtain independent of steps for obtaining the data. The document also includes a template for a query to use to obtain the data. The document indicates a period to wait between queries to the target data sources. For example, referring to FIG. 2, one or more components of the data collection system 202 parse a document (e.g., such as the document previously described).

At block 415, the target data sources are queried to discover the size of the data. For example, referring to FIG. 2, the preprocessor engine 205 (or another component) may query the data sources 235-237 to determine, among other things, the size of the data that needs to be obtained.

At block 420, based on the size, a data structure is generated that indicates chunks of data to obtain from the one or more target data sources. For example, referring to FIG. 2, the preprocessor engine 205 generates the chunk data structure 225.

At block 425, a query is generated using the template and the data structure. For example, referring to FIG. 2, the query manager 210 generates a query using a template from the declarative document and data from the chunk data structure 225.

At block 430, the query is submitted to one or more of the target data sources. For example, referring to FIG. 2, the query manager 210 may submit the query to one or more of the data sources 235-237. After a chunk of data is obtained in response to the query, the chunk of data is stored in a local data store.

At block 435, a determination is made as to whether there is another chunk that needs to be obtained. If so, the actions continue at block 440; otherwise, the actions continue at block 445.

At block 440, throttling of the next query occurs. For example, referring to FIG. 2, the timing manager 215 may wait for a period to expire and then inform the query manager 210 that it may submit another query. The timing manager 215 may determine the period based on data included in the declarative document previously indicated.

At block 445, other action, if any, may occur.

As can be seen from the foregoing detailed description, aspects have been described related to data collection. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
   discovering one or more target data sources from which to obtain data;
   generating a data structure that indicates a plurality of chunks of the data to obtain from the one or more target data sources;
   generating a plurality of queries from a template, the plurality of queries including values derived from the data structure to indicate the plurality of respective chunks of the data;
   submitting a first query of the plurality of queries to one or more of the one or more target data sources;
   receiving a response to the first query, the response including a respective chunk of the plurality of chunks;
   storing the chunk in a local data store;
   determining a plurality of periods to wait, each period corresponding to a respective query of the plurality of queries, the determining comprising:
      obtaining a formula from configuration data and using the formula to compute at least one of the plurality of periods;
   in response to the first query completing, waiting until the period that corresponds to the first query expires to submit another query of the plurality of queries, the waiting comprising:
      enabling one or more other queries that are not included in the plurality of queries to be processed; and
   performing the following operations for each subsequent query of the plurality of queries until the plurality of chunks is obtained:
      after the period that corresponds to the previous query has expired, submitting the query to obtain a respective chunk of the data from the one or more target data sources;
      receiving a response to the query, the response including a respective chunk of the plurality of chunks;
      storing the chunk in the local data store; and
      in response to the query completing, waiting until the period that corresponds to the query expires to submit another query of the plurality of queries, the waiting comprising:
         enabling one or more other queries that are not included in the plurality of queries to be processed,
      each period of the plurality of periods being determined prior to waiting until the respective period expires.

2. The method of claim 1, wherein determining the plurality of periods comprises:
   obtaining a value from configuration data and using the value as at least one of the plurality of periods.

3. The method of claim 1, wherein determining the plurality of periods comprises:
   using the formula to compute the plurality of periods.

4. The method of claim 3, wherein the formula is based on a total size of the data.

5. The method of claim 1, wherein the formula is based on a characteristic of the one or more target data sources.

6. The method of claim 1, wherein the formula is based on a size of at least one chunk of the plurality of chunks.

7. The method of claim 1, wherein a size of the chunks of the data is based on a total size of the data.

8. The method of claim 1, wherein a size of the chunks of the data is based on one or more performance characteristics of the one or more of the one or more target data sources to which the first query is submitted.

9. In a computing environment, a system, comprising:
   one or more processors;
   a preprocessor engine implemented using at least one of the one or more processors, the preprocessor engine configured to generate a data structure that indicates a plurality of chunks of data to obtain from one or more target data sources;
   a query manager implemented using at least one of the one or more processors, the query manager configured to generate a plurality of queries from a template, the plurality of queries including values derived from the data structure to indicate the plurality of chunks of the data, the query manager further configured to submit the plurality of queries to the one or more target data sources, a size of each chunk of the plurality of chunks is based on at least one of a total size of the data which is greater than the size of each chunk or one or more performance characteristics of the one or more target data sources to which the plurality of queries is submitted;
   a local store comprising a computer storage medium, the local store having storage elements to store the plurality of chunks received in response to the plurality of queries; and
   a persistence manager implemented using at least one of the one or more processors, the persistence manager operable to save the plurality of chunks to the local store.

10. The system of claim 9, further comprising a timing manager hosted on one or more computers, the timing manager configured to determine a period to wait between queries to the one or more target data sources, to wait until the period has expired, and to inform the query manager that the period has expired.

11. The system of claim 10, wherein the timing manager is configured to determine the period to wait by reading configuration data, the configuration data including data indicative of the period.

12. The system of claim 10, wherein the timing manager is configured to determine the period to wait by reading configuration data that includes a formula for computing the period to wait.

13. The system of claim 10, wherein the period to wait is based on at least one characteristic of at least one of the one or more target data sources to which the query is submitted.

14. The system of claim 10, wherein the period to wait is based on a size of at least one chunk of the plurality of chunks.

15. The system of claim 10, wherein the period to wait is based on a total size of the data.

16. The system of claim 9, wherein the local store further comprises non-volatile memory hosted on a device hosted by the persistence manager.

17. The system of claim 9, wherein the data sources are implemented as services accessible via the Internet.

18. A computer storage medium having computer-executable instructions, which when executed perform actions, comprising:
   parsing a document that includes declarative statements that indicate data to obtain from target data sources independent of steps for obtaining the data, the document also including a template for a query to use to obtain the data, the document also indicating a period to wait between queries to the target data sources;
   querying the target data sources to discover a size of the data;
   in response to querying the target data sources to discover the size of the data, generating a data structure that indicates chunks of the data to obtain from one or more of the target data sources, a size of the chunks is based on at least one of the size of the data which is greater than the size of the chunks or one or more performance characteristics of at least one of the target data sources;
   generating the query using the template and the data structure;
   submitting the query to the at least one of the target data sources; and
   throttling submitting another next query based on the period to wait.

19. The computer storage medium of claim 18, wherein the size of the chunks is based on at least one performance characteristic of at least one of the target data sources.

20. The computer storage medium of claim 18, wherein the document includes a formula for computing the period to wait.

* * * * *